United States Patent Office 3,532,007
Patented Oct. 6, 1970

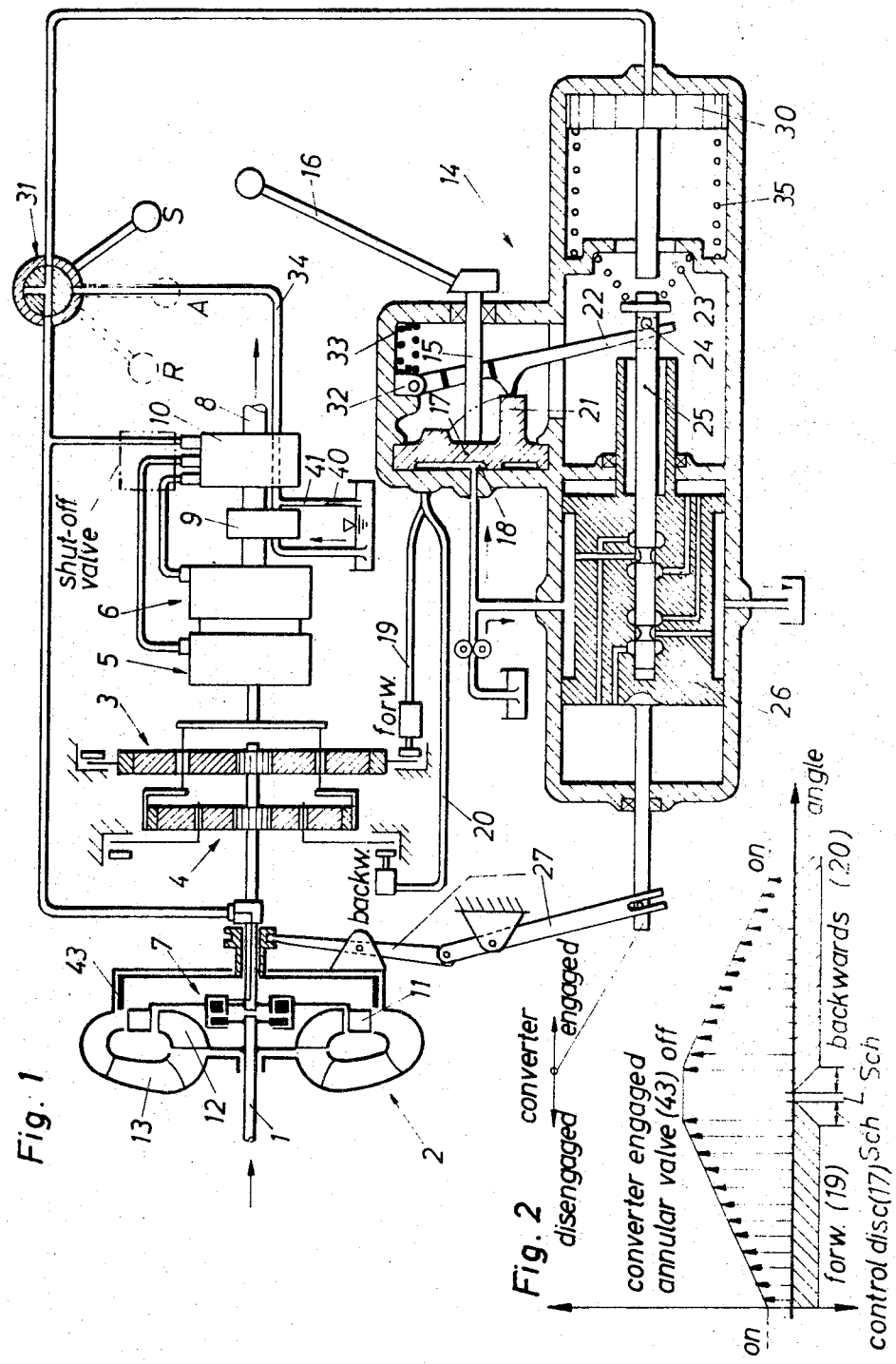

3,532,007
CONTROL FOR A HYDROMECHANICAL COMPOUND TRANSMISSION
Günther Paulsen, Heidenheim (Brenz), Siegfried Burr, Heidenheim - Mergelstetten, and Wilhelm Schäfer, Schwabmunchen, Germany, assignors to Voith Getriebe KG, Heidenheim (Brenz), Germany
Filed Dec. 20, 1968, Ser. No. 785,690
Claims priority, application Germany, Dec. 28, 1967, 1,650,894
Int. Cl. F16h 47/04; F16d 33/02
U.S. Cl. 74—733     6 Claims

ABSTRACT OF THE DISCLOSURE

A hydrodynamic-mechanical compound transmission including a variable converter and a mechanically operable reversing transmission adapted to be actuated by hydraulic friction clutches or brakes, which includes a one-lever control device adapted by pivoting within a small intermediate angle range to determine the driving direction and by pivoting beyond said range to control said converter from zero to full torque.

---

The present invention relates to a control for a hydromechanical compound transmission and, more specifically, concerns a control with an operating lever for a hydromechanical compound transmission with a variable flow converter and a mechanical change gear transmission which compound transmission has at least one hydrostatically controllable forward drive and one hydrostatically controllable rearward drive.

Such transmissions are used preferably in commercial vehicles, such as conveying devices and self-propelled working implements. These machines are in most instances used for forward as well as for rearward drive. With such devices one of the foremost requirements consists in that they must be easy to operate because the operator should be able to direct all of his attention to the particular job to be done.

It is, therefore, an object of the present invention to provide a one-lever operating device by means of which all driving operations of the drive can be accomplished by a mere tilting of the lever in one plane.

This object and other objects and advantages of the invention will appear more clearly from the following specification in connection with the accompanying drawing, in which:

FIG. 1 diagrammatically illustrates a multi-velocity range hydromechanical compound transmission with a converter control and with a control switch according to the invention.

FIG. 2 illustrates a cartesian function diagram of the face valve and the face cam.

The invention makes use, as customary with vehicles and machines of the above mentioned type, of a driving source which is controlled as to its speed at least during the initial driving phase. The problem underlying the present invention, starting from a transmission of the above mentioned type, has been solved according to the present invention by coupling the operating lever with a rotary control valve for the hydrostatic control of the velocity ranges. The said control lever is adapted to be tilted beyond the range employed for reversing the drive. The invention is furthermore characterized in that the control valve is provided with a symmetric control cam for controlling the power of the flow converter. The regions of said control cam with different height of the flanks are located outside the tilting range of the control valve, said tilting range governing the shifting of the velocity ranges.

By a simple forward and rearward tilting of a single lever the operator is able to select the driving direction and the driving speed of the vehicle. The elements for these two functions, control of the driving direction and control of the speed, are combined in a tiltable structural member while taking into consideration the timewise different occurrence of these functions.

Expediently, the two elements, valve and cam, are designed as face members which means as face valve and face cam while the cam elevation extends in axial direction. The element sensing the cam elevation is then able to transfer or convey the height of the cam elevation to a servopiston which is parallel to the pivot axis of the cam and the valve, and can effect this transfer by means of a servopin. The servopiston adjusts, for instance through an actuating linkage, the guide blades of the converter forming part of the compound transmission.

If it is desired to drive the vehicle at a higher speed than is possible with the starting velocity range, the controllable converter transmission is followed by at least one further velocity range. The velocity ranges which exceed the starting velocity range, are controlled by means of a control governor which is driven at a speed proportional to the driving speed. If a direct velocity range is provided which bridges the converter, the transmission ability is automatically adjusted to zero while circumventing emptying the converter. This may be brought about by causing the servopin of the servopiston to move to its respective extreme position. This is brought about by an auxiliary piston when engaging the direct drive.

If the transmission is used for driving, for instance, a vehicle at constant speed and at changing driving resistance, a corresponding control can easily be effected by a piston acting upon the servopin of the servopiston. The position of said piston is in conformity with the velocity. The coupling of servopin and control piston is so selected that with increasing velocity (positive control deviation), the servopin is moved out in the direction "converter disengaged," and vice versa. A piston the stroke of which is proportional to the speed will, for instance be realized by a unilaterally spring loaded piston which on the other hand is under the load of a volumetric pump driven in proportion to the speed. At the pressure side of said pump there is provided a throttled bypass of constant cross-section.

Referring now to the drawing in detail, the arrangement shown therein comprises an input shaft 1 for the hydromechanical compound transmission which comprises an adjustable converter 2, a planetary gear transmission 3 for forward drive and a planetary gear transmission 4 for rearward drive, and also comprises two additional hydrostatically controllable velocity ranges 5 and 6, and furthermore comprises the direct velocity range through the bridging clutch 7. The compound transmission also comprises a volumetric pump 9 driven by the output shaft 8, and a control governor 10 for shifting the velocity ranges 5, 6 and 7 in conformity with the driving speed. The control governor is provided with an axial annular valve member 43 which is adapted to be moved into the flow of the converter. However, it would also be possible to provide an adjusting possibility, for instance by an adjustable guiding wheel. In addition to the turbine wheel 11, the converter comprises, as is customary, a pump wheel 12 and a guiding apparatus 13.

The control device 14 has a pivotable plate 17 which is rotatable with the shaft 15 by a lever 16. On one end face of said plate 17 there are provided control edges which by rotating the plate 17 connect the pressure chamber 18 either with the control conduit 19 for forward drive or with the conduit 20 for rearward drive or in the intermediate position in which both said forward drive and said rearward drive are separated from the pressure chamber. On the opposite end face of plate 17 there is provided along a circle a cam 21 with axial extension of the cam elevation. The change in the height of the flank of the cam which occurs at a certain point when pivoting the cam, is sensed by the feeler arm 22 and is transformed into a corresponding axial movement of the servopin 25 which is under the pressure of a conical spring 23, and in view of a transverse pin 24 acting as edge is unilaterally continuously in frictional contact with the feeler arm and the cam. In view of the position of the servopin 25, the position of the associated servofollower piston 26 is always determined. The follower piston in its turn determines by way of lever 27 the axial position of the annular valve member 43 within the converter 2 and thereby the transfer ability thereof.

The cartesian function diagram of FIG. 2 indicates that in the pivoting range idling "L" of the end valve—both conduits 19 and 20 are separated from the pressure chamber 18—and in the adjacent pivoting range "Sch" for the face valve—both conduits 19 and 20 are connected to the pressure chamber—the cam shows no change in its elevation and therefore is without function. Outside the function shifting range of the valve—conduit 19, 20 remains in communication with the pressure chamber 18—the height of the flank of the cam changes and, more specifically, symmetrically for the shifting ranges "forward" and "rearward." The cam elevation is so designed that starting from the central position, following the engaging of the forward or rearward drive by the valve, the transmitting ability of the converter increases more and more by shifting away from the central position, and the vehicle will be accelerated in conformity therewith.

When the converter has been adjusted for a high output and when the vehicle during its starting range has reached its maximum velocity, the control converter 10 will, in conformity with this speed, shift over into the next higher mechanical velocity range by conveying pressure fluid to the control piston, for instance, of the velocity range 5, etc. Finally, the direct drive is engaged by bridging the converter 2 by means of clutch 7. In these circumstances, the annular valve member 43 is disengaged which means that the converter is taken out of the power flow. This is brought about by subjecting the auxiliary piston 30 to the control pressure for the bridging clutch 7. The auxiliary piston 30 is arranged in parallel with the actuating piston of clutch 7 by means of the three-way valve 31 occupying its position S (high speed). When this clutch is engaged, it will be appreciated that by means of the auxiliary piston 30, the control pin 25 and the servopiston 26 are pressed into their extreme position "converter disengaged." The bearing 32 of the feeler arm 22 in the housing will deviate against the thrust of spring 33 which latter is stronger than the spring 23.

When the three-way valve 31 occupies its position A, all three conduits leading to the valve are blocked. By a further valve (not shown) the velocity range control 10 is put out of action. Only the two starting velocity ranges (position A) can be used. In position R of the three-way valve 31, the conduit 34 coming from the pump 9 is in communication with the pressure chamber of the auxiliary piston 30. Pump 9 is driven from the output side and represents a volumetric pump with a bypass 41 which has a constant cross-section and is throttled by the nozzle 40. The bypass 41 is located at the pressure side. This means that in conduit 34 and therefore at the position R of valve 31 also in the pressure chamber of the auxiliary piston 30 there will prevail a pressure which is proportional to the output side or the driving speed. In cooperation with the spring 35 which presses the auxiliary piston 30 in the direction toward the outermost end position, with each driving speed and with a certain cam position, there will be obtained a certain position of the piston 30 or the servopin 25. When the driving velocity increases, for instance, by a reduction in the running resistance, the servopin 25 is pressed in the direction "converter disengaged," and the driving speed drops to the original value determined by the cam position. If, inversely, the driving resistance increases suddenly, so that the velocity will have the tendency to decrease, the auxiliary piston 30 presses the control pin 25 in the direction "converter open." The velocity will then increase to its rated value. In the position R of the valve 31, the transmission control is also designed as control for the driving or working speed. Also in this position the control governor is put out of operation.

The advantages of the invention are seen particularly in the simple expedient operating ability of a self-propelled working device or of a machine or vehicle by tilting a single lever only.

It is, of course, to be understood that the present invention is, by no means, limited to the particular showing in the drawing but also comprises modifications within the scope of the appended claims.

What we claim is:

1. For use in connection with a hydromechanical compound transmission including a variable fluid flow converter with control means therefor, and mechanical reversible transmission means having at least one hydrostatically shiftable forward velocity range and a hydrostatically shiftable rearward drive velocity range, a control device which comprises: rotary valve means operatively connected to said mechanical reversible transmission means for controlling the same, operating lever means operatively connected to said rotary valve means for hydrostatically controlling said velocity ranges, said operating lever means being shiftable beyond the adjusting range intended for the reversal of said mechanical reversible transmission means, said rotary valve means also being provided with symmetrical control cam means for controlling the output of said flow converter, the ranges of said control cam means being located with different heights of the flanks outside the pivoting range of said control valve.

2. A control device according to claim 1, which includes: a pivotally mounted control arm movable by said control cam means, and servomotor means operable to actuate said control means for said fluid flow converter, said servomotor means including a precontrol piston linked to the outer portion of said pivotally mounted control arm.

3. A control device according to claim 1, in which said rotary valve means is formed by a slide valve including a rotatable plate having its one end face provided with control edges operable to control the flow of fluid to and from said mechanical reversible transmission means.

4. A control device according to claim 3, in which said control cam means of said rotary valve means for controlling said fluid flow converter forms a cam located on one end face of said plate and extending in axial direction of said plate, said servomotor means being operatively connected to said control means for said flow converter and having its axis substantially parallel to the axis of said rotary valve means, said pivotally mounted control arm being pivotable in a plane defined by the axes of said rotary valve means and said servomotor means.

5. A control device according to claim 1, with means for controlling the output speed of said compound transmission to a contsant value, which includes: an auxiliary control piston movable in one direction from a rest position by fluid pressure in conformity with the output speed of said compound transmission, return means operable to return said auxiliary control piston to its rest position, said auxiliary control piston comprising a piston rod having its free end arranged for cooperation with said servomotor means so that the speed proportional pressure acts upon said servomotor means to bring about an adjustment of said converter control means to reduce the output of said converter.

6. For use in connection with a hydromechanical compound transmission having an input shaft and an output shaft and being located in a vehicle, which compound transmission comprises a variable fluid flow converter and for at least one driving direction of said vehicle has a plurality of hydrostatically shiftable velocity ranges and a shift control operable to shift said velocity ranges in conformity with the driving speed and the driving resistance and desired acceleration, and two planetary gear transmissions interposed between said fluid flow converter and said output shaft, a control apparatus which includes: pump means for delivering actuating fluid, fluid operable clutch means operable to bridge said fluid flow converter to drivingly bypass the latter, conduit means leading from said pump means to said clutch means, three-way valve means interposed in said conduit means, first cylinder means, pressure fluid operable double acting servopiston means reciprocable in said first cylinder means and being operatively connected to said clutch means, control rod means associated with said servopiston means for controlling the admission of pressure fluid to one or the other side of said servopiston means, rotary valve means comprising a rotatable disc controlling the admission of pressure fluid selectively to one or the other one of said planetary gear transmissions for forward or rearward drive respectively of said vehicle, an auxiliary cylinder hydraulically communicating with said three-way valve, pressure fluid operable auxiliary piston means having a connecting rod substantially in axial alignment with said control rod means for actuating the latter in conformity with the output speed of said output shaft, said rotatable disc being provided with cam surface means of an ascending and descending nature, pivotally supported sensing lever means in continuous engagement with said cam means and with said control rod means, first spring means continuously holding said control rod means and the free end of said lever means in operative engagement with each other, additional spring means continuously holding said lever means in operative engagement with said control rod means and second spring means associated with said auxiliary piston for returning the same to its ineffective position when the fluid pressure actuating on said auxiliary piston drops below the thrust of said second spring means.

References Cited

UNITED STATES PATENTS 2,376,699   5/1945   Jandasek _____ 74—733 X
2,392,520   1/1946   Benz et al. _____ 74—733

DONLEY J. STOCKING, Primary Examiner

T. C. PERRY, Assistant Examiner

U.S. Cl. X.R.

74—731; 192—3.3